United States Patent [19]

Raüsch

[11] Patent Number: 4,599,621
[45] Date of Patent: Jul. 8, 1986

[54] TWO-FREQUENCY GLIDE-PATH STATION FOR THE STANDARDIZED INSTRUMENT-LANDING SYSTEM ILS

[75] Inventor: Helmüt Raüsch, Schwieberdingen, Fed. Rep. of Germany

[73] Assignee: International Standard Electric Corporation, New York, N.Y.

[21] Appl. No.: 648,853

[22] Filed: Sep. 7, 1984

[30] Foreign Application Priority Data

Sep. 9, 1983 [DE] Fed. Rep. of Germany ....... 3332541

[51] Int. Cl.⁴ .............................................. G01S 1/16
[52] U.S. Cl. ................................................ 343/410
[58] Field of Search ............... 343/410, 411, 412, 413, 343/414, 17.7, 369

[56] References Cited

U.S. PATENT DOCUMENTS

| | | | |
|---|---|---|---|
| 3,389,392 | 6/1968 | Stauffer et al. | 343/411 |
| 3,713,160 | 1/1973 | Becavin | 343/414 |
| 4,032,920 | 6/1977 | Martin, Jr. et al. | 343/413 |
| 4,068,236 | 1/1978 | Alford | 343/413 |
| 4,107,688 | 8/1978 | Alford | 343/413 |

*Primary Examiner*—Theodore M. Blum
*Assistant Examiner*—David Cain
*Attorney, Agent, or Firm*—John T. O'Halloran; Robert P. Seitter

[57] ABSTRACT

To monitor the course signals radiated by the two-frequency glide-path station with respect to course line and course width, and to monitor the clearance signal, the signals radiated by the antennas (A1, A2, A3) and a signal extracted directly from the transmitter (1) are so combined (5, 6, 7) that the clearance signal (CL), the sideband signal (SBO), and the carrier and sideband signal are obtained. These signals are evaluated (8) for monitoring purposes in a manner known per se.

1 Claim, 1 Drawing Figure

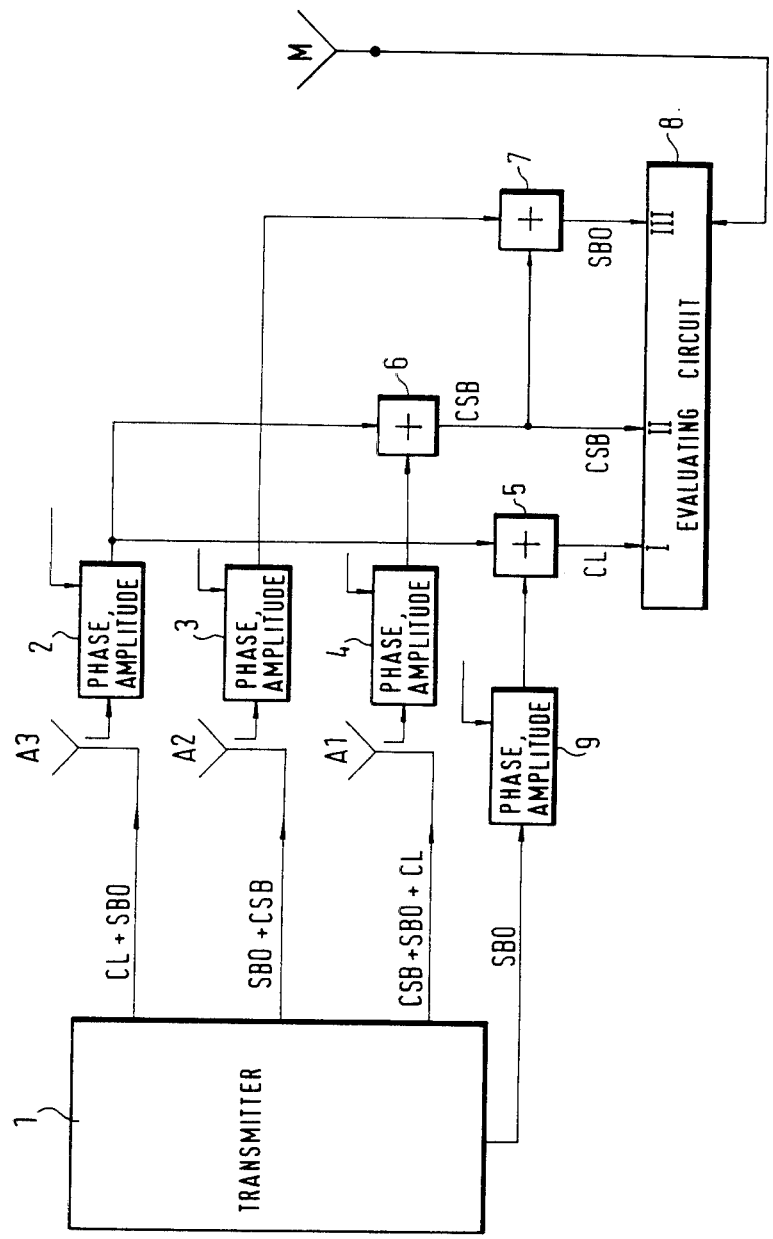

TWO-FREQUENCY GLIDE-PATH STATION FOR THE STANDARDIZED INSTRUMENT-LANDING SYSTEM ILS

The present invention relates to a two-frequency glide-path station as set forth in the preamble of the claim. Such a two-frequency glide-path station is described in International Standards and Recommended Practices, AERO-NAUTICAL TELECOMMUNICATIONS, Annex 10 to the Convention on International Civil Aviation, Volume I, Section 3.1.4.

In a glide-path station, which, together with a localizer, forms a ground station of the standardized instrument-landing system ILS, it is of great importance that the radiated signals be maintained at the prescribed values. Only then can reliable landing guidance be provided. It is indispensable that the radiated signals be monitored. The signals should, as far as possible, be monitored in the form as received by the airborne equipment of the instrument-landing system.

Difficulties are encountered with the monitoring of the clearance signal, which is radiated only by two-frequency glide-path stations. At elevation angles below the glide slope, only this signal is received ("capture effect"), but at the antenna, it is available only in combination with the other signals, so it is impossible to obtain this signal directly by extracting a portion of one of the signals fed to the antennas.

The object of the invention is to provide a two-frequency glide-path station comprising a monitoring facility which permits reliable monitoring of the course line, the course width, and the clearance signal.

The solution given in the claim permits the clearance signal, in particular, to be exactly monitored in a manner equivalent to that in the far field. It also makes it possible to monitor the course line and course width (in addition to the monitoring by means of the monitor antenna in the near field). The monitoring of the clearance signal can be supplemented by monitoring the direct transmitter signals. However, this monitoring alone is not sufficient, since errors may be caused in the lead networks from the transmitter to the antennas.

The invention will now be explained in more detail, by way of example, with reference to the accompanying drawing, whose single FIGURE is a block diagram of an embodiment of the invention.

The signals to be radiated by the two-frequency glide-path station are produced in a transmitter 1. The glide-path station has three antennas A1, A2, and A3. These antennas radiate the following sum signals:

antenna A3: clearance signal (CL)+sideband signal (SBO)
antenna A2: sideband signal (SBO)+carrier signal (CSB)
antenna A1: carrier signal (CSB)+sideband signal (SBO)+clearance signal (CL).

A portion of each of the sum signals is extracted by means of directional couplers, and the extracted portions are fed to devices 2, 3, and 4, in which the phases and amplitudes of the extracted signals can be changed. A portion of the sideband signal (SBO) is extracted directly from the transmitter and fed to an additional circuit 9 for adjusting the phase and amplitude of this signal.

To obtain the desired components of the sum signals fed to the antennas, the sum signals and the sideband signal extracted from the transmitter are suitably added. The signal components extracted from the antennas A1 and A3 are so added in an adder 6 that the signals CL and SBO cancel each other, so that only the signal CSB appears at the output of the adder 6. A portion of this signal is fed to an adder 7, which is also supplied with the signal extracted from the antenna A2. An adder 5 combines the signal extracted from the antenna A3 with the signal SBO extracted from the transmitter. The output of the adder 5 provides only the signal CL, and the output of the adder 7 only the signal SBO. The signals CL, CSB, and SBO are applied to the inputs I, II, and III of an evaluating circuit 8.

When adding the signals, it is important that the addition be performed with the correct phase and amplitude. Only then can the unwanted signal components be cancelled. Phase shifts are caused, inter alia, by different signal delays from the point of extraction to the adder. The evaluating circuit 8 evaluates the signal CL for monitoring the clearance signal, the signal CSB for monitoring the course line, and the sum signal CSB (II)+SBO (III) for monitoring the course width.

After turn-on of the glide-path station, a flight measurement of this station takes place. After the flight measurement, it is insured that the installation is functioning correctly. Only then will the phases and amplitudes of the extracted signals be correctly adjusted by means of the devices 1, 2, 3, 4, and 9. The adjustment is so performed that the unwanted signal components are completely cancelled. It is particularly important that the signals appearing at the evaluating circuit 8 contain no extraneous components, for only in this manner will the safety necessary for the monitoring process be achieved. Otherwise, it might be possible that the sensitivity during the monitoring process is lower than the sensitivity of airborne equipment for the instrument-landing system.

The description does not explain in detail how the signals fed to the antennas are produced, and how the signals applied to the evaluating circuit are evaluated for monitoring the course line, the course width, and the clearance signal, because this is known per se. The production of the signals is described, for example, in a book by Dr. Karl Bärner, "Flugsicherungstechnik", Hanns Reich Verlag, Munich, 1957, Chapter VII.3. If the signals CL, CSB, and SBO are available, the evaluation of these signals as to their amplitudes and modulation contents can take place as described in Section II of the handbook "ILS 3000" of Standard Elektrik Lorenz AG, Stuttgart.

I claim:

1. Two-frequency glide-path station for the standardized instrument-landing system ILS comprising several antennas (A1, A2, A3) which radiate sum signals (CSB+SBO+CL; SBO+CSB; CL+SBO) whose superposition in space gives course and clearance signals, and a facility for monitoring the radiated signals, the monitoring of the course line being performed with a monitor antenna (M) in the near field which is followed by an evaluating unit, and the monitoring of the course width being performed by extracting a portion of each of the sum signals fed to the antennas of the glide-path station and evaluating said portions, characterized in that the extracted portions of the sum signals and a sideband signal (SBO) extracted directly from the transmitter (1) are so combined (5, 6, 7) that further signals (CL, SBO, CSB) are obtained which, except for their amplitudes, are equal to the signals forming the sum signals, and that said further signals are evaluated in an evaluating circuit (8) for monitoring their prescribed values.

* * * * *